United States Patent [19]

Altenheiner et al.

[11] Patent Number: 4,630,901
[45] Date of Patent: Dec. 23, 1986

[54] BINOCULAR TELESCOPE WITH CENTRAL CONTROL

[75] Inventors: Erwin Altenheiner, Waldsolms-Hasselborn; Günther Schlicht, Solms-Oberbiel; Joachim Hornschu, Königsbronn, all of Fed. Rep. of Germany

[73] Assignee: Carl-Zeiss-Stiftung, Heidenheim on the Brenz, Fed. Rep. of Germany

[21] Appl. No.: 697,274

[22] Filed: Feb. 1, 1985

[30] Foreign Application Priority Data

Feb. 11, 1984 [DE] Fed. Rep. of Germany ... 8404136[U]

[51] Int. Cl.⁴ .......................... G02B 23/00; G02B 7/06
[52] U.S. Cl. .................................................... 350/552
[58] Field of Search ............................... 350/548–549, 350/552, 554–556

[56] References Cited

U.S. PATENT DOCUMENTS 3,484,149 12/1969 Becker et al. ........................ 350/552
3,712,704 1/1973 Sato ..................................... 350/554

FOREIGN PATENT DOCUMENTS 2841611 4/1979 Fed. Rep. of Germany ...... 350/554
425267 5/1967 Switzerland ........................ 350/552

Primary Examiner—William H. Punter
Attorney, Agent, or Firm—Stonebraker, Shepard & Stephens

[57] ABSTRACT

A new binocular telescope with a central pivot shaft or pin has a first adjustment knob at the eyepiece end of the shaft for joint focusing of both telescopes, and a second adjustment knob at the objective end of the shaft for focusing an individual one of the telescopes, to provide a correction or compensation for defective vision of the user of the instrument. With the exception of the adjustment knobs, all mechanical and optical elements are contained within the telescope housing. The telescope is characterized, in particular, by a slight depth of the hinge shaft to the ascending outer shape of the housing.

7 Claims, 4 Drawing Figures

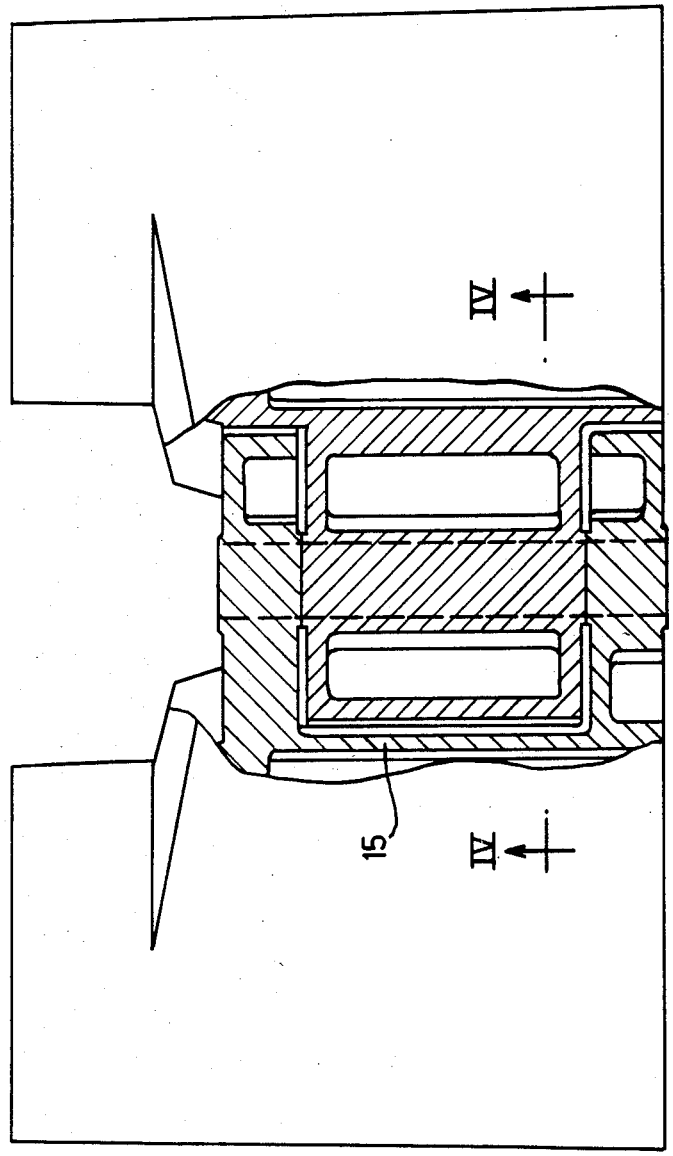

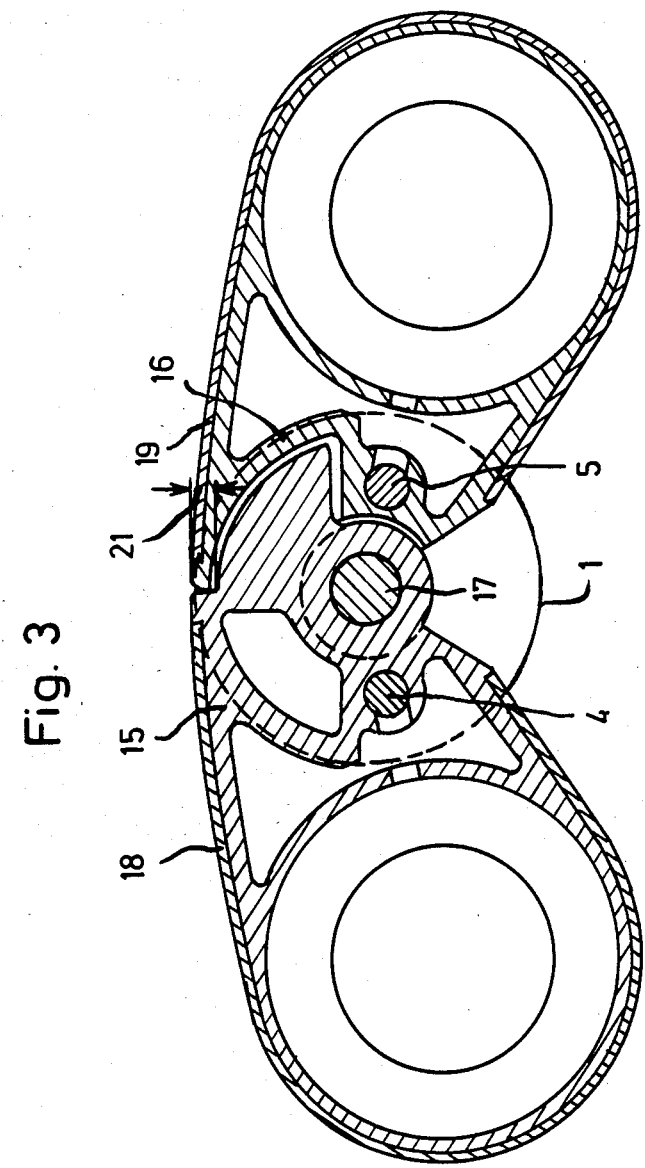

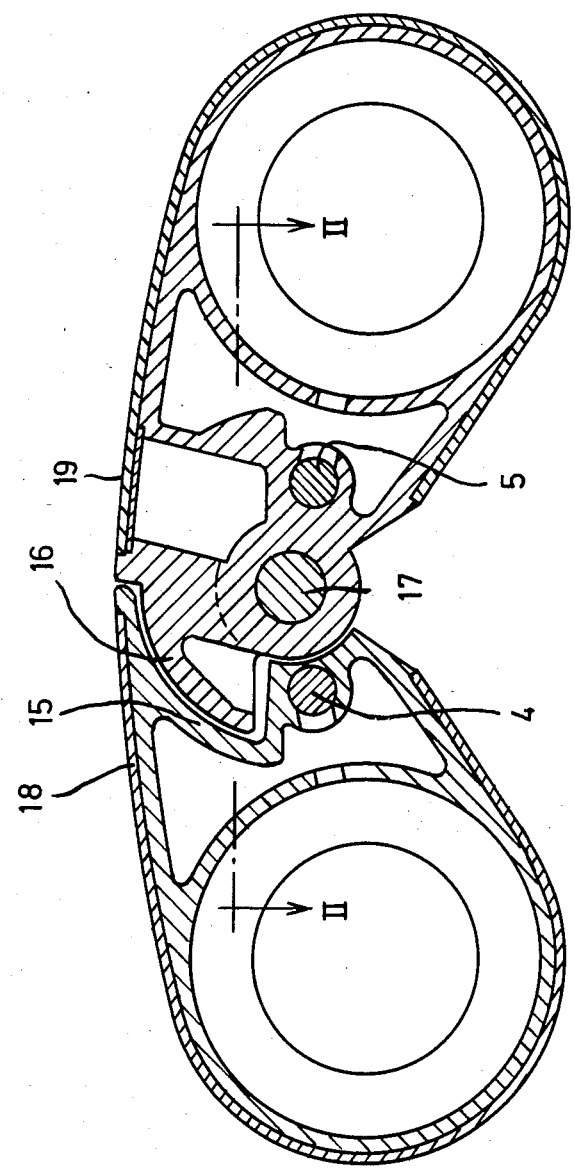

BINOCULAR TELESCOPE WITH CENTRAL CONTROL

BACKGROUND OF THE INVENTION

This invention relates to a binocular telescope in which the two binocular tubes are hinged to each other, and in which the control for adjustment for defective vision of the user, as well as the control for focusing upon objects at different distances, are arranged centrally.

In binocular telescopes, commonly known as binoculars, it is desirable to have a construction which is compact and of light weight while at the same time permitting the integrating, so far as possible, of all mechanical and optical parts within the housing.

The object of the invention is to improve known binoculars in such a way that, while being of slender construction, easy assembly and reliable adjustment of the optical elements is assured.

This object is achieved, according to the invention, by arranging an adjustment knob on the eyepiece side of the hinge joint between the two tubes, this adjustment knob being connected with a linearly guided drive disk via a screw thread. Two push rods are operated by the drive disk and engage, via drive parts, into the mounts of the telescope objectives, to move these objectives for focusing. Another adjustment knob is arranged on the objective side of the hinge. This second knob, which serves to correct for faulty vision of the user, is provided with a toothed wheel or gear which drives a pinion firmly connected to one of the two push rods, whereby the drive part of the objective of only one of the two binocular tubes is displaced axially by means of a screw thread.

The linear guidance of the drive disk for the focus adjusting knob is preferably provided by a guide pin. The linear guidance of the push rods which are connected via drive parts with the objective mounts is preferably provided by longitudinal grooves.

In a preferred embodiment of the invention, the housing tubes of the two individual telescopes are formed as half shells which engage in each other and surround the hinge shaft, and they have an ascending external shape toward the shaft.

With a tangential course of the outer surfaces of the two knobs to the housings of the individual telescopes, a particularly attractive shape of a binocular telescope is obtained.

The advantages of the invention include especially the shape which promotes simple and easy handling in use, as well as easy assembly of the parts during manufacture, and the attractive appearance of the shape, resulting in part from the slight depth of the hinge shoulder and the ascending outer shape of the individual telescope housings.

BRIEF DESCRIPTION OF THE DRAWINGS

In the accompanying drawings, illustrating a preferred embodiment of the invention.

FIG. 2 is a fragmentary plan of the construction, again with parts broken away and parts in section, the section being taken on the line II—II of FIG. 4;

FIG. 3 is a section similar to that of FIG. 4 but taken on a different plane;

FIG. 4 is a section taken approximately on the line IV—IV of FIG. 2.

DETAILED DESCRIPTION OF PREFERRED EMBODIMENT

Figure 1:
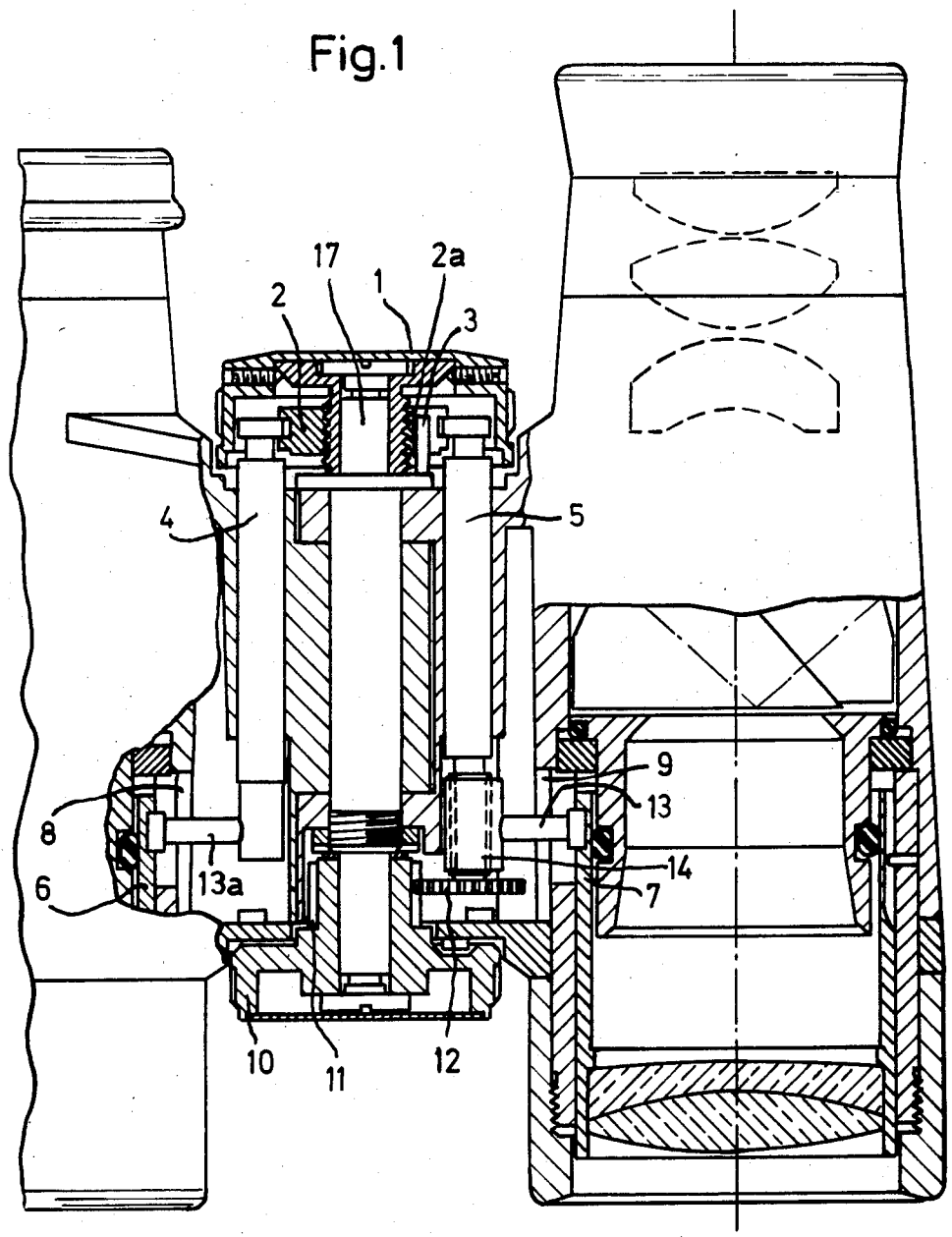
FIG. 1 is a plan view of a binocular telescope according to the invention, with parts in longitudinal section and parts broken away.

FIG. 1 shows the major parts of a binocular telescope with many of the standard and well-known parts omitted or shown only schematically. The two barrels or tubes are hinged together as customary. Between the tubes, at the end of the hinge closest to the eyepieces of the tubes, there is a rotary adjustment knob 1 which serves for focusing, i.e., for simultaneously moving the two objectives in the two tubes or barrels.

This adjusting knob 1 has a hollow shank or hub which turns on one end of a central guide shaft or bearing shaft 17, which also forms the hinge axis. Each of the tubes has a connecting portion which surrounds this hinge shaft 17. A drive disk 2 has internal threads which ride on external threads 2a on the hub. The drive disk is prevented from rotating by a fixed guide pin 3 which enters an axially extending slot in the disk 2. An enlarged screw head overlying a shoulder on the hub of the knob keeps the hub and knob from moving axially on the bearing shaft 17. Therefore, as the knob 1 is turned, the drive disk travels axially along the threads of the hub.

Two connecting members or transmission members 4 and 5, in the form of push rods mounted for axial movement in guiding channels, have heads which engage in a circumferential slot in the drive disk 2. The push rod 4, for operating the objective of the left-hand tube, has a lateral arm 13a fixed rigidly to it. This arm passes through a longitudinal guide slot 8 in the housing and engages the mount 6 of the objective in the left-hand tube or barrel, to cause axial focusing movement of the objective when the rod 4 is moved axially by axial movement of the drive disk 2 in response to rotation of the focusing knob 1.

For moving the objective of the right-hand tube, there is a similar lateral arm 13 extending through a longitudinal guide groove 9 and engaging the mount 7 of the objective, to cause axial movement thereof. However, this operating arm 13 is not fixed directly to the push rod 5 in the way that the arm 13a is fixed to the rod 4. Instead, the arm 13 is fixed to a sleeve or collar 14 which is threadedly mounted on the push rod 5, so that the arm 13 and collar 14 will travel axially on the rod 5 if the rod 5 is rotated. This enables the objective in the right-hand tube to be moved axially without moving the objective in the left-hand tube, in order to compensate for defective vision of the user.

To make any necessary compensating adjustment, there is an adjusting knob 10 mounted for rotation on the end of the central shaft 17 which is toward the objectives; that is, the end opposite to the focusing knob 1. Like the knob 1, the knob 10 is held against axial movement by an enlarged screw head, as plainly seen in FIG. 1. The hub of the knob 10 has external gear teeth 11, which mesh with the teeth of a gear 12 which is fixed to the push rod 5. Thus rotation of the knob 10 causes rotation of the rod 5, with the result that the threaded sleeve 14 travels up or down this rod, causing the arm 13 to move the associated objective to correct for defective vision. When the vision correcting adjustment has been made, rotation of the other knob 1 will cause both objectives to move axially in unison, for focusing upon objects at different distances.

From the partial sectional view of FIG. 2, one can note the shape of the bridge region of one embodiment of the invention, shown in further detail in FIGS. 3 and 4. From FIG. 3 there can be noted particularly the slight depth of the hinge shoulder, characterized by the arrow 21, which in this embodiment amounts to 2.5 mm or less. In the case of known telescopes of this type, the hinge shoulder depth is usually about 11 mm. In this embodiment, the housing tubes of the individual telescopes are developed as half-shells 15, 16 which engage in each other as illustrated. They surround the central hinge shaft 17, and have a centrally ascending outer shape 18, 19. The outer surfaces of the adjustment knobs are aligned approximately tangentially with respect to adjacent portions of the housing.

What is claimed is:

1. A binocular telescope comprising, in combination:
   (a) two telescope tubes hinged to each other, each of said tubes having an eyepiece near one end thereof and an objective axially movable within the tube near the other end thereof;
   (b) a central hinge shaft on which said two tubes swing relative to each other, said shaft having an eyepiece end and an objective end;
   (c) each of said tubes having a housing portion which receives said eyepiece and said objective, and a connecting portion which surrounds said hinge shaft;
   (d) an adjustment knob (1) for joint focusing of said objectives in both tubes, said adjustment knob being mounted between said tubes near said eyepiece end of said shaft;
   (e) a linearly guided drive disk (2) operatively connected by screw threads to said adjustment knob;
   (f) two transmission members (4, 5) both operatively connected to said drive disk to be moved thereby and each having a drive part (13, 13a) operatively connected to a mount (6, 7) of one of said objectives to cause focusing movement of the respective objective;
   (g) a second adjustment knob (10) for moving said objective in only one of said tubes to focus one tube differently than the other tube to compensate for defective vision of a user, said second adjustment knob being mounted between said tubes near said objective end of said shaft;
   (h) one of said drive parts (13) being connected to its said transmission member (5) by means of a screw thread so that rotation of said transmission member will cause said drive part to travel axially on said transmission member;
   (i) a pinion (12) fixed to said one of said transmission members (5); and
   (j) gear teeth (11) turned by said second adjustment knob and meshing with said pinion so that rotation of said second adjustment knob will cause rotation of said transmission member (5) to cause its said drive part (13) to travel axially, thereby to cause focusing movement of its associated objective mount (7) of one tube independently of focusing movement of said objective mount in the other tube.

2. The invention defined in claim 1, further comprising a guide pin (3) for guiding said drive disk (2) linearly.

3. The invention defined in claim 1, wherein said drive parts (13, 13a) are linearly guided in longitudinal grooves (8, 9). ]

4. The invention defined in claim 1, wherein said connecting portions which surround said shaft (17) are in the form of half shells (15, 16) engaging in one another and have an ascending outer shape (18, 19) toward said shaft.

5. The invention defined in claim 4, wherein both of said adjustment knobs (1, 10) have outer surfaces aligned approximately tangentially with respect to portions (18, 19) of said housing.

6. A binocular telescope comprising, in combination:
   (a) two telescope tube members hinged to each other, each of said tube members having an eyepiece near one end thereof and an objective mount axially movable within the tube member near the other end thereof;
   (b) a central hinge shaft on which said two tube members may swing relative to each other, said shaft having an eyepiece end and an objective end;
   (c) each of said tube members having a portion which surrounds said hinge shaft;
   (d) an adjustment knob (1) for joint simultaneous focusing of both of said objective mounts in their respective tube members, said adjustment knob being mounted for rotation coaxially with said shaft near said eyepiece end thereof and having a hub with an external screw thread;
   (e) a drive disk (2) surrounding and threadedly engaged with said screw thread on said hub;
   (f) means (3) holding said drive disk against rotation so that when said adjustment knob is rotated said screw thread will cause said drive disk to move axially;
   (g) a first transmission member (4) operatively connected to said disk to move axially therewith;
   (h) a first drive part (13a) mounted in fixed position on said first transmission member and engagng said objective mount in one of said tube members to cause axial movement of such objective mount when said first transmission member moves axially;
   (i) a second transmission member (5) operatively connected to said disk to move axially therewith;
   (j) a second drive part (13) mounted in an adjustable position on said second transmission member and engaging said objective mount in the other one of said tube members to cause axial movement of such objective mount when said second transmission member moves axially;
   (k) a second adjusting knob (10) mounted for rotation coaxially with said shaft near said objective end thereof; and
   (l) means responsive to rotation of said second knob for adjusting the position of said second drive part relative to said second transmission member, whereby to enable the objective mount in one tube member to be moved axially relative to the objective mount in the other tube member, to compensate for defective vision of a user of said binocular telescope.

7. The invention defined in claim 6, wherein said means responsive to rotation of said second knob includes a screw threaded portion of said second transmission member, a mating screw threaded portion of said second drive part, and means for rotating said second transmission member from rotation of said second adjusting knob.

* * * * *